United States Patent Office 3,375,260
Patented Mar. 26, 1968

3,375,260
19-NOR-9β,10α-STEROIDS OF THE PREGNANE SERIES
Albert Bowers, Atherton, Calif., Pierre Crabbé, Mexico City, Mexico, and John Edwards, Los Altos, Calif., assignors to Syntex Corporation, Panama, Panama, a corporation of Panama
No Drawing. Continuation-in-part of application Ser. No. 210,211, July 16, 1962. This application Mar. 8, 1965, Ser. No. 438,069
Claims priority, application Mexico, Dec. 4, 1961, 65,269
10 Claims. (Cl. 260—397.3)

This application is a continuation-in-part of our copending U.S. patent application Ser. No. 210,211, filed July 16, 1962 now abandoned.

This invention relates to novel cyclopentanopolyhydrophenanthrene derivatives and to processes for the preparation thereof.

More particularly, this invention relates to novel steroid compounds of the 19-norpregnane series having abnormal configuration at the centers of asymmetry of the steroid skeleton, and particularly at carbon atoms 9 and 10, which compounds can be represented by the following general formula:

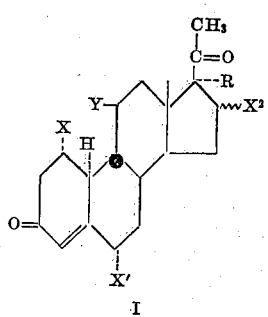

In this formula R represents hydrogen, an α-hydroxyl group or an α-acyloxy group, X, $X^1$ and $X^2$ each represent hydrogen or methyl, with X being hydrogen when either $X^1$ or $X^2$ is methyl, Y represents hydrogen, β-hydroxyl or a keto group, and the symbol ⦚ indicates that a methyl substituent on the 16-carbon atom can have either the α- or the β-configuration.

The acyloxy and acyl groups referred to herein are preferably derived from hydrocarbon carboxylic acids containing less than 12 carbon atoms. These acids can be saturated or unsaturated (including aromatic), and can have straight or branched aliphatic, cycloaliphatic, cycloaliphatic-substituted aliphatic and aromatic-substituted aliphatic chains. In addition, they can be unsubstituted or substituted with one or more functional groups, such as hydroxyl, alkoxy or amino groups, halogen atoms, and the like. Included among such ester groups are acetate, trimethylacetate, t-butylacetate, phenoxyacetate, aminoacetate, propionate, cyclopentylpropionate, β-chloropropionate, valerate, enanthate, undecenoate and benzoate groups.

The novel 19-nor-9β,10α-pregnane derivatives of the present invention which are unsubstituted at the 6-, 16- and 17-positions can be prepared by processes which can be illustrated schematically as follows:

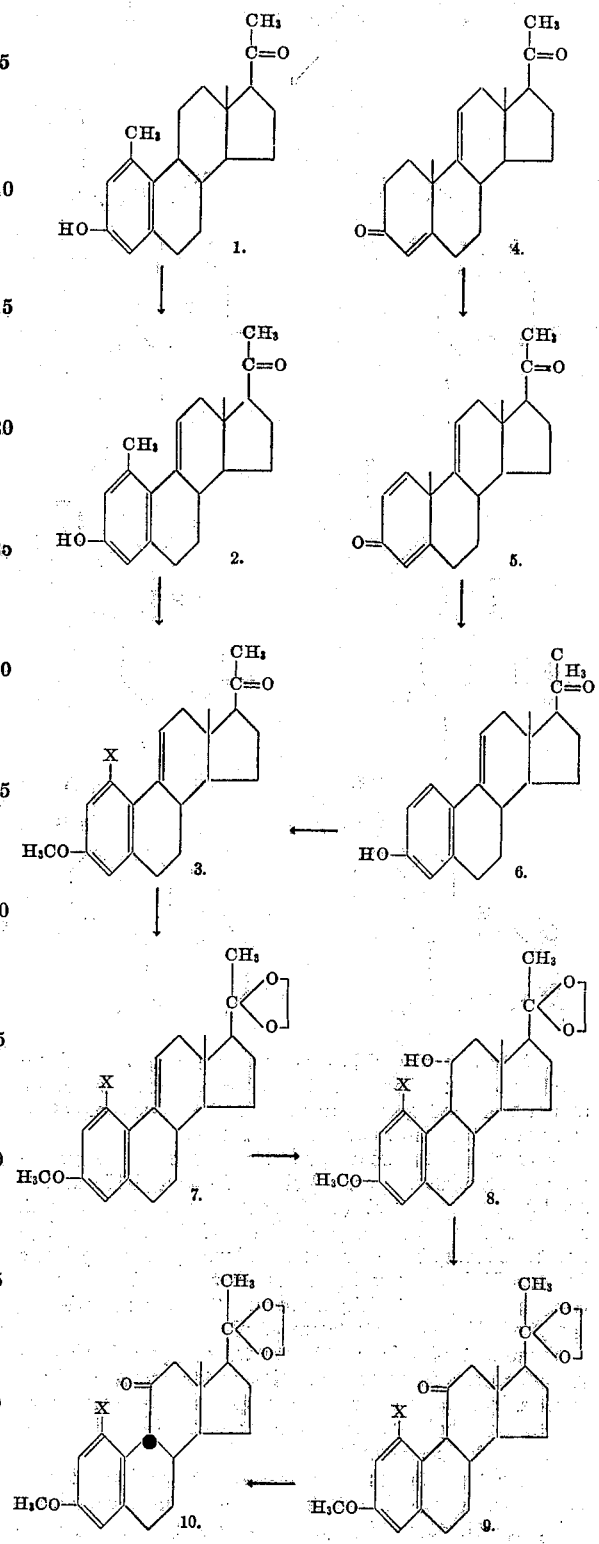

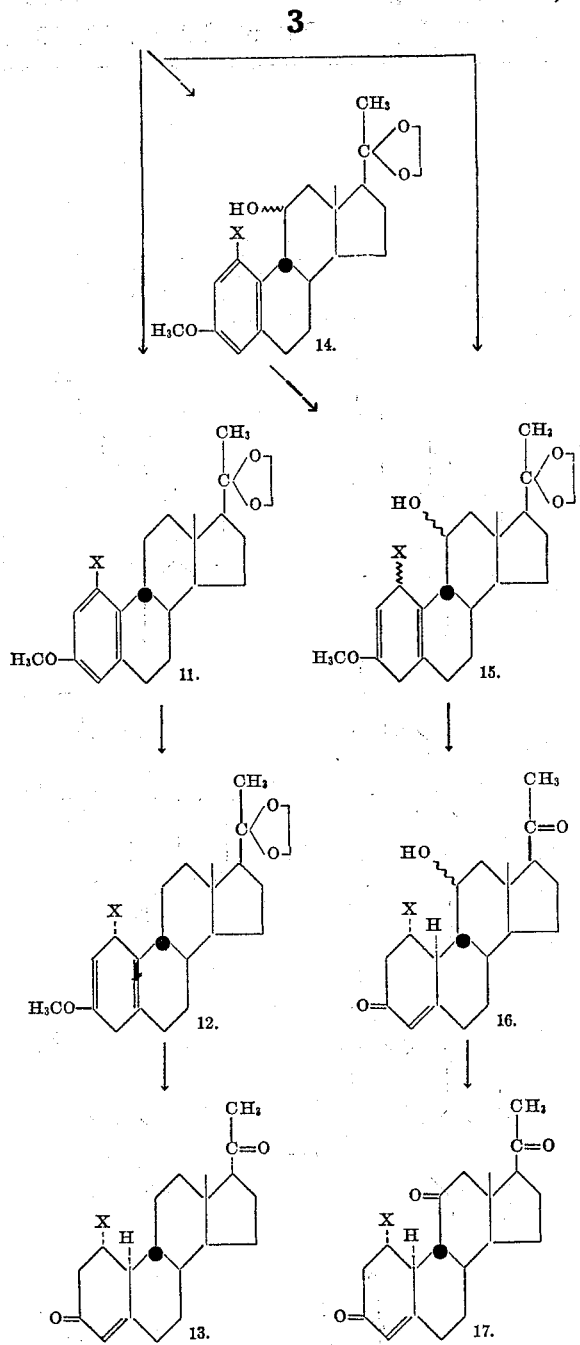

In these formulas X has the same meaning as set forth hereinabove for Formula I, and the symbol ⌇ indicates that a hydroxyl group attached to the 11-carbon atom can have either the α- or β-configuration.

In practicing the above-illustrated processes, where 1α-methyl derivatives are desired 1 - methyl-17β-acetyl-Δ$^{1,3,5(10)}$-estratrien-3-ol (1) is first dehydrogenated with a chlorinated quinone, preferably 2,3-dichloro-5,6-dicyano-1,4-benzoquinone or tetrachloro - p - benzoquinone (chloranil) in solution in dioxane or t-butanol to give the corresponding Δ$^{9(11)}$-dehydro steroid 2, i.e., 1-methyl-17β-acetyl-Δ$^{1,3,5(10),9(11)}$-estratetraen-3-ol.

Treatment of this 9(11)-dehydro compound with dimethyl sulfate in acetone solution in the presence of potassium hydroxide gives the corresponding 3-methyl ether 3, i.e., 1-methyl-3-methoxy-17β-acetyl-Δ$^{1,3,5(10),9(11)}$-estratetraene (3; X=methyl).

Where 1-unsubstituted derivatives are desired, Δ$^{9,(11)}$-dehydroprogesterone (4) is dehydrogenated, preferably using 2,3-dichloro-5,6-dicyano-1,4-benzoquinone in dioxane solution for a period of time in the order of 6 to 10 hours, thus giving Δ$^{1,4,9(11)}$-pregnatriene-3,20-dione (5).

The thus-obtained pregnatriene is then reacted with zinc or zinc-copper couple in aqueous pyridine or ethylene glycol as solvent, preferably for 10 to 24 hours when zinc is used and for a shorter time, i.e., from 2 to 6 hours, when zinc-copper couple is used, to effect aromatization of the A ring, thus giving 17β-acetyl-Δ$^{1,3,5(10),9(11)}$-estratetraen-3-ol (6).

Treatment of the resulting estratetraene with dimethyl sulfate in acetone solution in the presence of potassium hydroxide gives the corresponding 3-methyl ether 3, i.e., 3-methoxy - 17β - acetyl - Δ$^{1,3,5(10),9(11)}$ - estratetraene (3; X=hydrogen).

Treatment of a 3-methoxy-17β-acetyl-Δ$^{1,3,5(10),9(11)}$-estratetraene 3 (X=hydrogen or methyl) with ethylene glycol in benzene solution in the presence of p-toluenesulfonic acid gives the corresponding 20-ketal 7, e.g., 3 - methoxy - 20 - cycloethylenedioxy - 19 - nor-Δ$^{1,3,5(10),9(11)}$-pregnatetraene (7; X=hydrogen).

The thus-obtained 20-ketal is treated with a stream of diborane in tetrahydrofuran solution for a period of time in the order of 1 to 3 hours, and the resulting organoboron compound is then treated with alkaline hydrogen peroxide to give the corresponding 11α-hydroxy steroid 8, e.g., 3-methoxy-20-cycloethylenedioxy-19-nor-Δ$^{1,3,5(10)}$-pregnatrien-11α-ol (8; X=hydrogen).

Oxidation of the resulting 11α-hydroxy steroid with chromic acid in pyridine solution gives the corresponding 11-keto steroid 9, e.g., 3-methoxy-20-cycloethylenedioxy-19-nor-Δ$^{1,3,5(10)}$-pregnatrien-11-one (9; X=hydrogen).

Upon treatment of this 11-one with a dilute solution of a strong base in a lower aliphatic alcohol, preferably 1% methanolic potassium hydroxide, at reflux temperature for 5–24 hours under an inert nitrogen atmosphere, the steric configuration at C–9 is inverted, thus producing the corresponding 9β-steroid 10, e.g., 3-methoxy-20-cycloethylenedioxy-19-nor-9β-Δ$^{1,3,5(10)}$-pregnatrien-11-one (10; X=hydrogen).

Where the 11-unoxygenated derivatives are desired, the 11-keto function in this 9β-11-keto steroid is eliminated by reduction under Wolff-Kishner conditions, thus giving the corresponding 11-unoxygenated steroid 11, e.g., 3-methoxy - 20 - cycloethylenedioxy - 19 - nor - 9β-Δ$^{1,3,5(10)}$-pregnatriene (11; X=hydrogen).

Reduction of the resulting 11-unoxygenated steroid under Birch conditions, using lithium in liquid ammonia, gives the Δ$^{2,5(10)}$-diene 12, e.g., 3-methoxy-20-cycloethylenedioxy-19-nor-9β-Δ$^{2,5(10)}$-pregnadiene (12; X=hydrogen).

Acid hydrolysis of this Δ$^{2,5(10)}$-diene, preferably carried out using hydrochloric acid in methanol at reflux temperature, removes the protective groups at C–3 and C–20, thus producing the 19-nor-9β,10α-Δ$^4$-pregnene-3,20-dione 13, e.g., 19-nor-9β,10α-Δ$^4$-pregnene-3,20-dione itself (19-nor-9β,10α-progesterone, X=hydrogen).

Where the 11-oxygenated derivatives are desired, the 11-keto group in the 9β-11-keto steroid 10, e.g., 3-methoxy-20 - cycloethylenedioxy - 19 - nor-9β-Δ$^{1,3,5(10)}$-pregnatrien-11-one (10; X=hydrogen) can be reduced, using lithium aluminum hydride or sodium borohydride, thus giving a mixture of 11α- and 11β-alcohols 14, e.g., 3-methoxy-20-cycloethylenedioxy-19 - nor-9β-Δ$^{1,3,5(10)}$-pregnatrien - 11α-ol and 3 - methoxy-20-cycloethylenedioxy - 19- nor - 9 β-Δ$^{1,3,5(10)}$-pregnatrien-11β-ol (14; X=hydrogen), which can either be separated chromatographically or by fractional crystallization at this point or used as such in the next step.

Reduction of the resulting 11-hydroxy steroids under Birch conditions, using lithium in liquid ammonia, gives the Δ$^{2,5(10)}$-diene 15, e.g., 3-methoxy-20-cycloethylenedioxy-19-nor-9β-Δ$^{2,5(10)}$-pregnadien-11 (α and/or β)-ol (15; X=hydrogen).

Alternatively, reduction of both the 11-keto group and the aromatic A ring can be effected in one step by subjecting the 9β-11-keto steroid 10 to Birch reduction conditions.

The Δ²,⁵⁽¹⁰⁾-diene is then hydrolyzed, using hydrochloric acid in methanol, in the manner described hereinabove, to remove the protective groups at C–3 and C–20, thus giving the 19-nor-9β,10α-Δ⁴-pregnen-11-ol-3,20-dione 16, e.g., 19-nor-9β,10α-Δ⁴-pregnen-11α-ol-3,20-dione and 19-nor-9β,10α-Δ⁴-pregnen-11β-ol-3,20-dione (16; X=hydrogen), which can be separated chromatographically or by fractional crystallization, if desired, to give the individual 11-ols.

Oxidation of the thus-obtained 11α-ol, 11β-ol or a mixture thereof, using 8 N chromic acid in acetone solution, produces the corresponding 11-keto steroid 17, e.g., 19-nor-9β,10α-Δ⁴-pregnene-3,11,20-trione (17; X=hydrogen).

The novel 19-nor-17α-hydroxy- and -acyloxy-9β,10α-pregnane derivatives of the present invention which are unsubstituted at the 6- and 16-positions can be prepared by processes which can be illustrated schematically as follows:

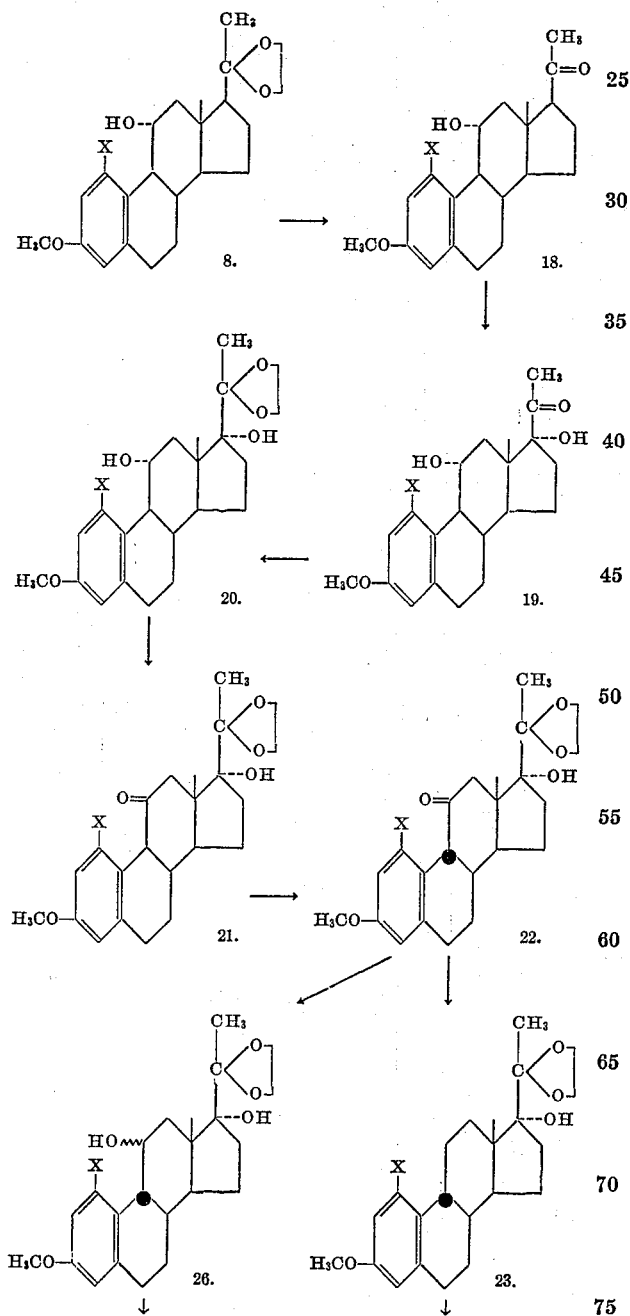

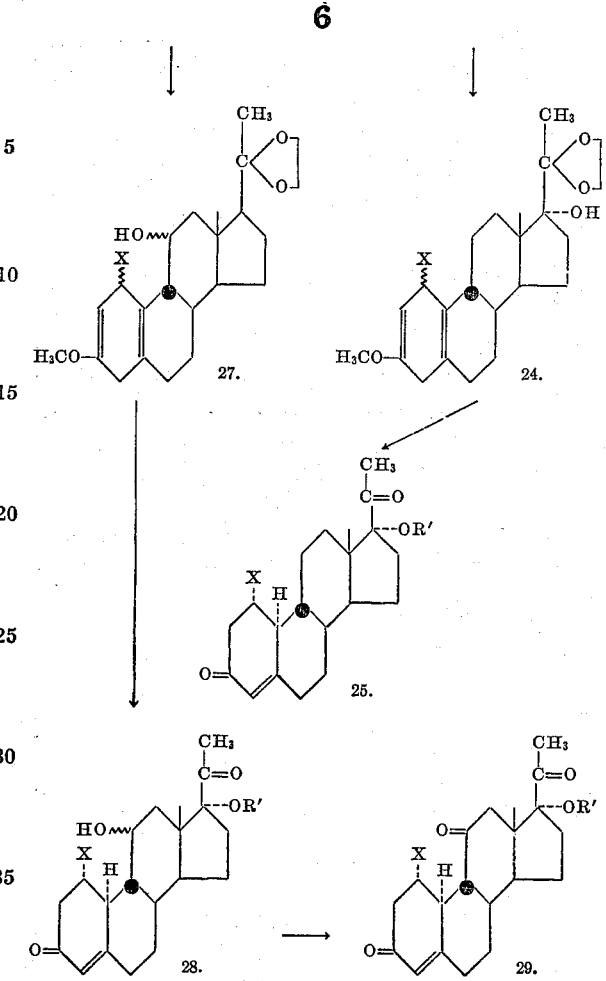

In these formulas X and the symbol ⌇ (when used with the 11-hydroxyl group) have the same meanings as set forth hereinabove for Formulas I and 14, respectively, and R¹ represents hydrogen or an acyl group.

In practicing the above-illustrated processes, the starting material 8, e.g., 3-methoxy-20-cycloethylenedioxy-19-nor-Δ¹,³,⁵⁽¹⁰⁾-pregnatrien-11α-ol (8; X=hydrogen) obtained as described hereinabove, is hydrolyzed with p-toluenesulfonic acid in acetone to give the corresponding free 20-one 18, e.g., 3-methoxy-19-nor-Δ¹,³,⁵⁽¹⁰⁾-pregnatrien-11α-ol-20-one (18; X=hydrogen).

A hydroxyl group is then introduced at the 17α-position in this 11α-hydroxy steroid by the Gallagher method, i.e., by formation of the 20-enol acetate with concomitant acetylation of the 11α-hydroxyl group, epoxidation of the C-17, 20-double bond with perbenzoic acid, and finally opening of the epoxide ring with potassium hydroxide in methanol, with simultaneous saponification of the 11α-acetoxy group, thus giving the corresponding 11α,17α-diol-20-one 19, e.g., 3-methoxy-19-nor-Δ¹,³,⁵⁽¹⁰⁾-pregnatriene-11α,17α-diol-20-one (19; X=hydrogen).

Treatment of this 11α,17α-diol-20-one with ethylene glycol in benzene solution in the presence of p-toluenesulfonic acid gives the corresponding 20-ketal 20, e.g., 3-methoxy-20-cycloethylenedioxy-19-nor-Δ¹,³,⁵⁽¹⁰⁾-pregnatriene-11α,17α-diol (20; X=hydrogen).

Oxidation of the 11α-hydroxy group in the resulting 20-ketal, using chromium trioxide in pyridine at room temperature, gives the corresponding 11-one 21, e.g., 3-methoxy-20-cycloethylenedioxy-19-nor-Δ¹³,⁵⁽¹⁰⁾-pregnatrien-17α-ol-11-one (21; X=hydrogen).

Upon treatment of the thus-obtained 11-one with a dilute solution of a strong base in a lower aliphatic alcohol, preferably 1% methanolic potassium hydroxide, at reflux temperature for 5–24 hours under an inert nitrogen atmosphere, the steric configuration at C–9 is inverted, thus producing the corresponding 9β-steroid 22, e.g., 3-methoxy - 20 - cycloethylenedioxy - 19-nor-9β-Δ$^{1,3,5(10)}$-pregnatrien-17α-ol-11-one (22; X=hydrogen).

Where the 11-unoxygenated derivatives are desired, the 11-keto function in this 9β-11-keto steroid is eliminated by reduction under Wolff-Kishner conditions, thus giving the corresponding 11-unoxygenated steroid 23, e.g., 3-methoxy - 20 - cycloethylenedioxy - 19 - nor-9β-Δ$^{1,3,5(10)}$-pregnatrien-17α-ol (23; X=hydrogen).

Reduction of the resulting 11-unoxygenated steroid under Birch conditions, using lithium in liquid ammonia, gives the Δ$^{2,5(10)}$-diene 24, e.g., 3-methoxy-20-cycloethylenedioxy - 19 - nor - 9βΔ$^{2,5(10)}$-pregnadien-17α-ol (24; X=hydrogen).

Acid hydrolysis of this Δ$^{2,5(10)}$-diene in the manner described hereinabove removes the protective groups at C–3 and C–20, thus producing the 19-nor-9β,10α-Δ$^4$-pregnen-17α-ol-3,20-dione 25, e.g., 19-nor-9β,10α-Δ$^4$-pregnen-17α-ol-3,20-dione itself (25; R$^1$ and X=hydrogen).

Esterification of the 17α-hydroxy group in the thus-obtained 17α-ol 25 is effected with acid anhydrides in benzene solution in the presence of p-toluenesulfonic acid, followed by acid treatment of the acylation reaction mixture, e.g., using a 1–5% methanolic solution of concentrated hydrochloric acid and boiling for from about 1 hour to about 3 hours, to hydrolyze the 3-enol acylate grouping formed during the reaction and regenerate the Δ$^4$-3-keto structure. Thus, for example, by esterifying 19-nor-9β,10α-Δ$^4$-pregnen-17α-ol-3,20-dione with acetic anhydride in benzene solution in the presence of p-toluenesulfonic acid, and then adding a 2% methanolic solution of concentrated hydrochloric acid to the acylation reaction mixture and boiling for 2 hours, the corresponding 17-monoacetate is obtained (25; R$^1$=acetyl, X=hydrogen).

Where the 11-oxygenated derivatives are desired, the 11-keto group in the 9β-11-keto steroid 22, e.g., 3-methoxy - 20 - cycloethylenedioxy-19-nor-9β-Δ$^{1,3,5(10)}$-pregnatrien-17α-ol-11-one (22; X=hydrogen) can be reduced, using lithium aluminum hydride or sodium borohydride, thus giving a mixture of 11α- and 11β-alcohols 26, e.g., 3-methoxy - 20 - cycloethylenedioxy-19-nor-9β-Δ$^{1,3,5(10)}$-pregnatriene-11α,17α-diol and 3 - methoxy-20-cycloethylenedioxy-19-nor-9β-Δ$^{1,3,5(10)}$ - pregnatriene-11β,-17α-diol (26; X=hydrogen), which can either be separated chromatographically or by fractional crystallization at this point or used as such in the next step.

Reduction of the resulting 11-hydroxy steroids under Birch conditions, using lithium in liquid ammonia, gives the Δ$^{2,5(10)}$-diene 27, e.g., 3-methoxy-20-cycloethylenedioxy-19-nor-9β-Δ$^{2,5(10)}$-pregnadiene-11(α and/or β), 17α-diol (27; X=hydrogen).

Alternatively, reduction of both the 11-keto group and the aromatic A ring can be effected in one step by subjecting the 9β-11-keto steroid 22 to Birch reduction conditions.

The Δ$^{2,5(10)}$-diene is then hydrolyzed under acidic conditions in the manner described hereinabove to remove the protective groups at C–3 and C–20, thus giving the 19-nor-9β,10α-Δ$^4$-pregnene-11β,17α-diol-3,20-dione 28, e.g., 19-nor - 9β,10α-Δ$^4$-pregnene-11α,17α-diol-3,20-dione and 19-nor-9β,10α-Δ$^4$-pregnene-11β,17α-diol-3,20-dione (28; R$^1$ and X=hydrogen), which can be separated chromatographically or by fractional crystallization to give the individual 11-ols.

Esterification of the 17α-hydroxy group in a 19-nor-9β,10α-Δ$^4$-pregnene-11β,17α-diol-3,20-dione 28, e.g., 19-nor-9β,10α-Δ$^4$-pregnene-11β,17α-diol-3,20-dione itself (28; R$^1$ and X=hydrogen) is effected by first reacting with an acid anhydride in benzene in the presence of p-toluenesulfonic acid to give the corresponding 3-enol acylate -11,-17-diacylate, then treating with acid to hydrolyze the 3-enol acylate grouping, and finally hydrolyzing the thus-obtained 11,17-diester with a 1–5% solution of sodium or potassium bicarbonate in aqueous methanol at 0–20° C. for 1–18 hours to selectively hydrolyze the 11-acyloxy group and give the 17-monoester. Thus, for example, by carrying out this procedure using acetic anhydride as the acylating agent, 19-nor-9β,10α-Δ$^4$-pregnene-11β,17α-diol-3,20-dione 17-acetate (28; R$^1$=acetyl, X=hydrogen) is obtained.

The 11-keto steroids 29 are obtained by first oxidizing the 11β-hydroxy group in a 19-nor-9β,10α-Δ$^4$-pregnene-11β,17α-diol-3,20-dione 17-acylate 28, e.g., 19-nor-9β,10α-Δ$^4$-pregnene-11β,17α-diol-3,20-dione 17-acetate (28; R$^1$=acetyl, X=hydrogen), using chromium trioxide in pyridine or 8 N chromic acid in acetone solution, to give the corresponding 11-one 17-acylate 29, e.g., 19-nor-9β,10α-Δ$^4$-pregnen-17α-ol-3,11,20-trione 17-acetate (29; R$^1$=acetyl, X=hydrogen).

The 17α-acyloxy group in the thus-obtained 11-one 17-acylate can then be hydrolyzed, using methanolic potassium hydroxide at reflux temperature for 5–12 hours under an inert nitrogen atmosphere, thus giving the free 11-one-17α-ol 29, e.g., 19-nor-9β,10α-Δ$^4$-pregnen-17α-ol-3,11,20-trione (29; R$^1$ and X=hydrogen).

An alternate procedure for the preparation of the 3-methoxy-20-cycloethylenedioxy-19-nor-9β-Δ$^{1,3,5(10)}$ - pregnatrien-17α-ol-11-one intermediate 22 can be illustrated schematically as follows:

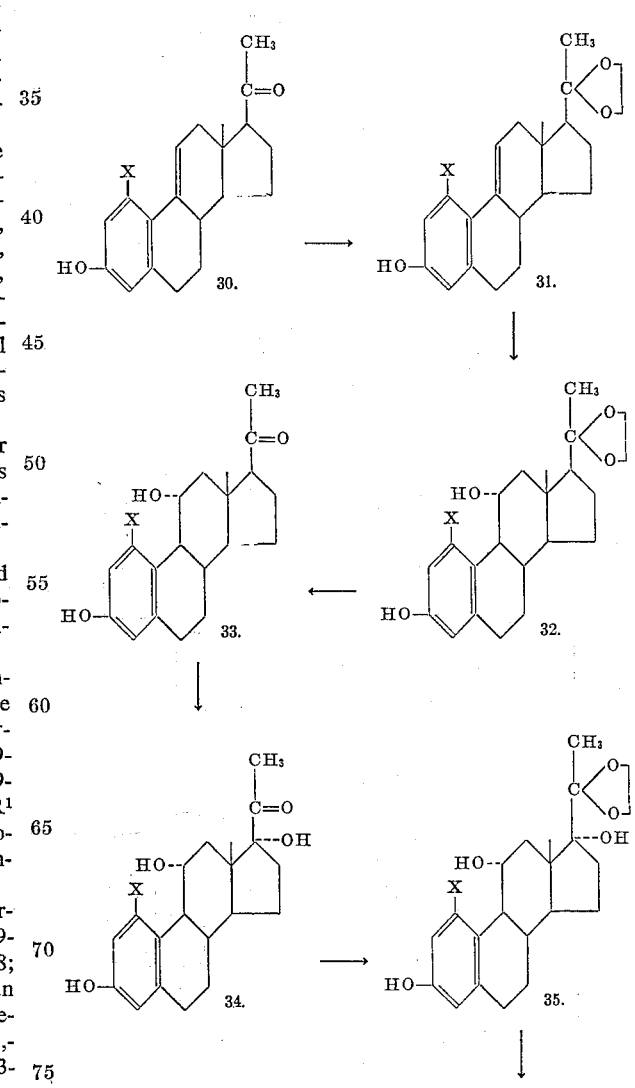

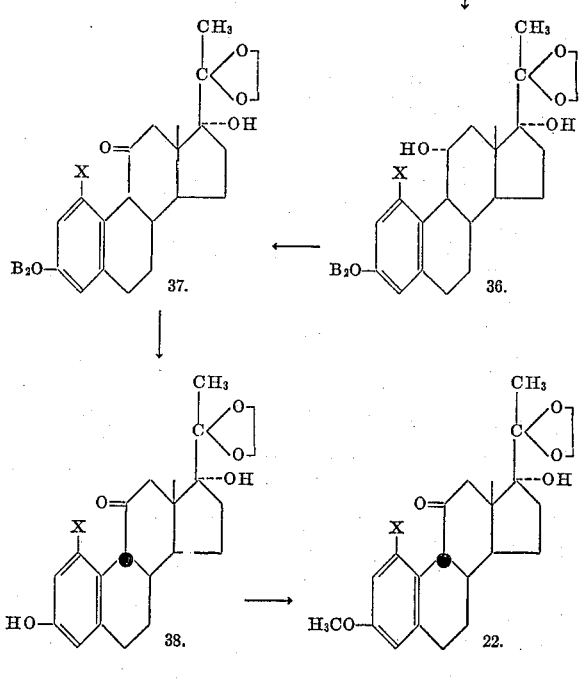

In these formulas X has the same meaning as set forth hereinabove for Formula I and $B_z$ represents a benzoyl group.

In practicing the above-illustrated process the starting material 30, i.e., 17β-acetyl-$\Delta^{1,3,5(10),9(11)}$-estratetraen-3-ol or 1-methyl-17β-acetyl-$\Delta^{1,3,5(10),9(11)}$-estratetraen-3-ol, obtained as described hereinabove, is treated with ethylene glycol in benzene solution in the presence of p-toluenesulfonic acid to give the corresponding 20-ketal 31, e.g., 20-cycloethylenedioxy-19-nor - $\Delta^{1,3,5(10),9(11)}$ - pregnatetraen-3-ol (31; X=hydrogen).

This 20-ketal is treated with a stream of diborane in tetrahydrofuran solution in the manner described hereinabove, then treated with alkaline hydrogen peroxide, thus giving the 11α-ol 32, e.g., 20-cycloethylenedioxy-19-nor-$\Delta^{1,3,5(10)}$-pregnatriene-3-11α-diol (32; X=hydrogen).

Acid hydrolysis of the thus-obtained 20-cycloethylenedioxy-11α-ol gives the corresponding 20-keto steroid 33, e.g., 19-nor-$\Delta^{1,3,5(10)}$-pregnatriene-3,11α-diol-20-one (33; X=hydrogen).

A hydroxyl group is then introduced at the 17α-position in this 3,11α-diol-20-one by the Gallagher method, thus giving the corresponding 3,11α,17α-triol-20-one 34, e.g., 19-nor-$\Delta^{1,3,5(10)}$-pregnatriene-3,11α,17α-triol-20-one (34; X=hydrogen).

Ketalization of the 20-keto group in the resulting 3,11α,17α-triol-20-one in the manner described hereinabove gives the corresponding 20-ketal 35, e.g., 20-cycloethylenedioxy-19-nor-$\Delta^{1,3,5(10)}$-pregnatriene-3,11α,17α-triol (35; X=hydrogen).

By subjecting this 3,11α,17α-triol to the Schotten-Baumann reaction, i.e., using benzoyl chloride and aqueous sodium hydroxide at room temperature, the corresponding 3-benzoate 36, e.g., 20-cycloethylenedioxy-19-nor-$\Delta^{1,3,5(10)}$ - pregnatriene - 3,11α,17α - triol 3-benzoate (36; X=hydrogen), is obtained.

Oxidation of the 11α-hydroxy group in the resulting 3-benzoate, using chromium trioxide in pyridine at room temperature, gives the corresponding 11-one 37, e.g., 20-cycloethylenedioxy-19-nor-$\Delta^{1,3,5(10)}$ - pregnatriene - 3,17α-diol-11-one 3-benzoate (37; X=hydrogen).

Upon treatment of this 11-one with a dilute solution of a strong base in a lower aliphatic alcohol in the manner described hereinabove, the steric configuration at C-9 is inverted and the benzoyloxy group at C-3 is hydrolyzed, thus producing the 3-hydroxy-9β-steroid 38, e.g., 20-cycloethylenedioxy-19-nor - 9β - $\Delta^{1,3,5(10)}$-pregnatriene-3,-17α-diol-11-one (38; X=hydrogen).

Treatment of this 3-hydroxy-9β-steroid with dimethyl sulfate in acetone solution in the presence of potassium carbonate gives the corresponding 3-methyl ether 22, e.g., 3-methoxy-20-cycloethylenedioxy-19-nor - 9β - $\Delta^{1,3,5(10)}$-pregnatrien-17α-ol-11-one (22; X=hydrogen).

The novel 19-nor-9β,10α-pregnane derivatives of the present invention which are substituted at the 6-, 16- and 17-positions can be prepared by processes which can be illustrated schematically as follows:

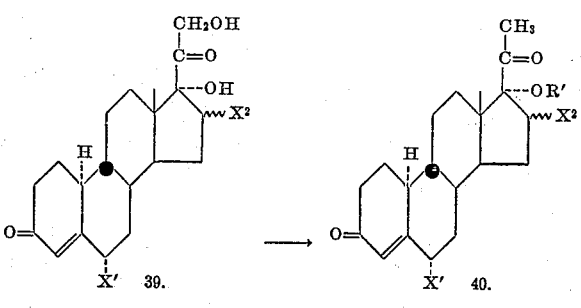

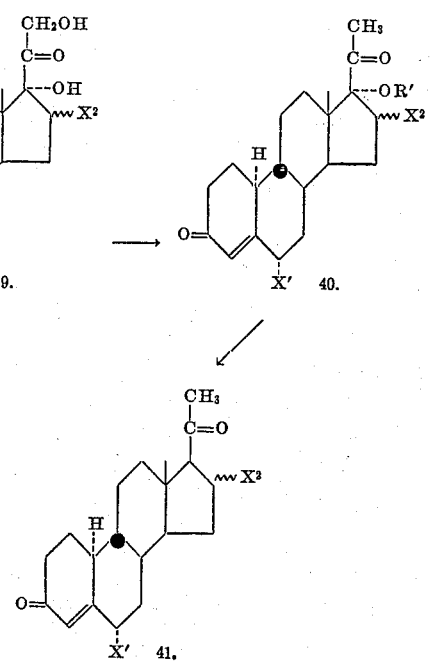

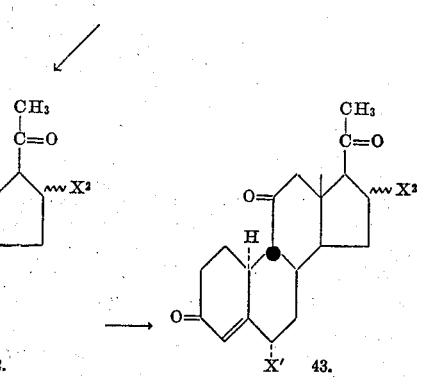

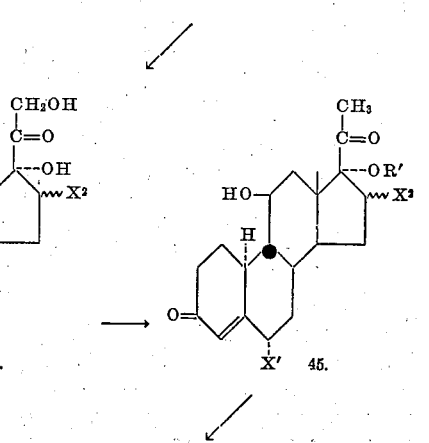

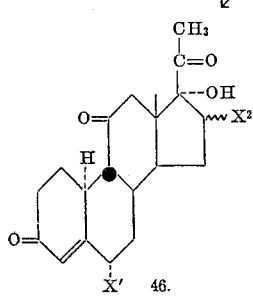

In these formulas $R^1$, $X^1$ and $X^2$ have the same meanings as set forth hereinabove for Formulas 25 and I, with at least one of $X^1$ and $X^2$ representing methyl.

In practicing the first of these processes (39→43), the starting material 39, i.e., 6α-methyl-, 16α-methyl-, 16β-methyl-, 6α,16α-dimethyl- or 6α,16β-dimethyl-19-nor-9β,-10α-Δ⁴-pregnene-17α-21-diol-3,20-dione, obtained as described in our aforementioned copending U.S. patent application or as described in our copending U.S. patent application Ser. No. 438,084, filed concurrently herewith, now abandoned, is reduced by first treating it with tosyl chloride in pyridine solution at 0° C. and then refluxing the resulting 21-tosylate with sodium iodide in acetic acid for a period of time in the order of 2 hours, thus producing the corresponding 21 desoxy steroid 40, e.g., 6α-methyl-19 - nor - 9β,10α - Δ⁴-pregnen-17α-ol-3,20-dione (40; $X^1$=methyl, $R^1$ and $X^2$=hydrogen).

The free 17α-hydroxy group in this 21 desoxy steroid can be esterified in the manner described hereinabove for compound 25. Thus, for example, esterification of 6α-methyl-19-nor-9β,10α-Δ⁴-pregnen-17α-ol-3,20 - dione with acetic anhydried in benzene in the presence of p-toluenesulfonic acid, followed by hydrolysis of the 3-enol acetate grouping with methanolic concentrated hydrochloric acid, gives the corresponding 17-acetate (40; $R^1$=acetyl, $X^1$=methyl, $X^2$=hydrogen).

The free 17α-hydroxy group in this 21-desoxy steroid can also be eliminated by reaction with zinc dust in aqueous acetic acid, preferably aqueous 80% acetic acid, at reflux temperature for a period of time in the order of 10 hours, thus producing the corresponding 6α-, 16α-, or 16β-methyl or 6α,16β-dimethyl-19-nor-9β,10α-progesterone derivative 41, e.g., 6α-methyl-19-nor-Δ⁴-pregnene-3,20-dione (41; $X^1$=methyl, $X^2$=hydrogen).

Adrenal incubation of the thus-obtained compound according to the method described in U.S. Patent No. 2,671,752 to Zaffaroni produces the corresponding 11β-hydroxy steroid 42, e.g., 6α-methyl-19-nor-9β,10α-Δ⁴-pregnen-11β-ol-3,20-dione (42; $X^1$=methyl, $X^2$=hydrogen).

Finally, oxidation of the 11β-hydroxy group in the resulting 11β-hydroxy steroid, using 8 N chromic acid in acetone solution, gives the corresponding 11-keto steroid 43, e.g., 6α-methyl-19-nor-9β,10α-Δ⁴-pregnene-3,11,20-trione (43; $X^1$=methyl, $X^2$=hydrogen).

In practicing the second of these processes, the starting material 44; i.e., 6α-methyl-, 16α-methyl-, 16β-methyl-, 6α,16α-dimethyl- or 6α,16β-dimethyl-19-nor-9β,10α-Δ⁴-pregnene-11β,17α,21-triol-3,20-dione, also obtained as described in our aforementioned copending U.S. patent application or as described in our copending U.S. Patent application Ser. No. 438,084, filed concurrently herewith, is reduced in the manner described herein-above for step 39→40, thus giving the corresponding 21-desoxy steroid 45, e.g., 6α-methyl-19-nor-9β,10α-Δ⁴-pregnene-11β,17α-diol-3,20-dione (45; $X^1$=methyl, $R^1$ and $X^2$=hydrogen).

The free 17α-hydroxyl group in this 11β-hydroxy-21-desoxy steroid can be esterified in the manner described hereinabove for compound 28. Thus, for example, esterification of 6α-methyl-19-nor-9β,10α-Δ⁴-pregnene-11β,17α,-21-triol-3,20-dione or 6α-methyl - 19 - nor - 9β,10α - Δ⁴-pregnene-17α,21-diol-3,11,20-trione with acetic anhydride in benzene in the presence of p-toluenesulfonic acid, followed by hydrolysis of the 3-enol acetate grouping with methanolic concentrated hydrochloric acid and then hydrolysis of the thus-obtained 11,17-diester with aqueous methanolic sodium or potassium bicarbonate in the manner described hereinabove, gives the corresponding 17-acetate (45; $R^1$=acetyl, $X^1$=methyl, $X^2$=hydrogen).

The 11-keto steroids 46 are obtained by first oxidizing the 11β-hydroxy group in a 6α-methyl-, 16-methyl- or 6α, 16-dimethyl-19-nor-9β,10α - Δ⁴ - pregnene - 11β,17α-diol-3,20-dione 17-acylate, using chromium trioxide in pyridine or 8 N chromic acid in acetone solution, to give the corresponding 11-acylate 46, e.g., 6α-methyl-19-nor-9β,10α-Δ⁴-pregnen-17α-ol-3,11,20 - trione 17 - acetate (46; $R^1$=acetyl, $X^1$=methyl, $X^2$=hydrogen).

The 17α-acyloxy group in the thus-obtained 11-one 17-acylate can then be hydrolyzed, using methanolic potassium hydroxide in the manner described hereinabove, to give the free 11-one-17α-ol 46, e.g., 6α-methyl-19-nor-9β,10α-Δ⁴-pregnen-17α-ol - 3,11,20 - trione (46; $R^1$ and $X^2$=hydrogen, $X^1$=methyl).

The novel 19-nor-9β,10α-pregnane derivatives of the present invention represented by Formula I hereinabove are progestational agents having oral activity. In addition, they have anti-androgenic activity and are useful in fertility control in humans and animals.

In order that those skilled in the art can more fully understand the present invention, the following examples are set forth. These examples are given solely for the purpose of illustrating the invention, and should not be considered as expressing limitations unless so set forth in the appended claims.

Example I

Twenty grams of Δ⁹⁽¹¹⁾-dehydroprogesterone were added to 400 cc. of dioxane and 14 grams of 2,3-dichloro-5,6-dicyano-1,4-benzoquinone, and the resulting reaction mixture was refluxed for 10 hours. Following this reaction period the reaction mixture was cooled, the 2,3-dichloro-5,6-dicyano-1,4 - benzohydroquinone formed during the reaction was filtered off, and the filtrate was then evaporated to dryness. The resulting residue was dissolved in acetone, then filtered through 400 grams of alumina, and finally crystallized from acetone/hexane, thus giving Δ¹,⁴,⁹⁽¹¹⁾-pregnatriene-3,20-dione.

Example II

A mixture of 612 cc. of pyridine, 1388 cc. of water, 200 grams of zinc dust and 10 grams of Δ¹,⁴,⁹⁽¹¹⁾-pregnatriene-3,20-dione was refluxed, with stirring, for 20 hours. Following this reaction period the zinc was filtered off and the filtrate was then crystallized to ⅓ its volume under reduced pressure and diluted with water. Next, the diluted filtrate was extracted with methylene dichloride, and the resulting extract was washed with 5% hydrochloric acid, then with 5% sodium carbonate and finally with water until neutral, then dried over anhydrous sodium sulfate and evaporated to dryness. Chromatography of the resulting residue on 500 grams of alumina gave 17β-acetyl - Δ¹,³,⁵⁽¹⁰⁾,⁹⁽¹¹⁾ - estratetraen-3 - ol, identical to an authentic sample [Mills et al., J. Am. Chem. Soc., 82, 5882 (1960)].

Example III

A mixture of 10 grams of 1-methyl-17β-acetyl-Δ¹,³,⁵⁽¹⁰⁾-estratrien-3-ol, 150 cc. of dioxane and 12 grams 2,3-dichloro-5,6-dicyano-1,4-benzoquinone was refluxed under an inert nitrogen atmosphere for 24 hours. Following this reaction period the reaction mixture was worked up in the manner described in Exampe I hereinabove (chromatography of the residue obtained upon evaporation of the filtrate was carried out using 50 times its weight of washed alumina), thus giving 1-methyl-17β-acetyl-Δ¹,³,⁵⁽¹⁰⁾,⁹⁽¹¹⁾-estratetraen-3-ol.

Example IV

A solution of 14 grams of potassium hydroxide in 7.5 cc. of water was added to a suspension of 5 grams of 17β-acetyl-$\Delta^{1,3,5(10),9(11)}$-estraterien-3-ol in 10 cc. of acetone, and the resulting mixture was treated dropwise, with stirring, with 8 cc. of dimethyl sulfate. Following this addition the reaction mixture was stirred for an additional 45 minutes, following which it was poured over a dilute solution of hydrochloric acid and the resulting precipitate was collected by filtration, washed with water until neutral and dried. Crystallization from chloroform/methanol gave 3-methoxy-17β-acetyl-$\Delta^{1,3,5(10),9(11)}$-estratetraene.

By repeating this procedure using 1-methyl-17β-acetyl-$\Delta^{1,3,5(10),9(11)}$-estratetraen-3-ol as the steroid starting material, the corresponding 3-methyl ether was obtained.

Example V

A mixture of 5 grams of 3 - methoxy - 17β - acetyl-$\Delta^{1,3,5(10),9(11)}$-estratetraene, 125 cc. of anhydrous benzene, 25 cc. of ethylene glycol and 250 mg. of p-toluenesulfonic acid was refluxed for 8 hours, using a water separator to remove the water formed during the reaction. Following this reaction period the reaction mixture was washed with 5% sodium bicarbonate solution until neutral, then dried over anhydrous sodium sulfate and evaporated to dryness. Crystallization from acetone/hexane gave 3-methoxy-20-cycloethylenedioxy-19-nor-$\Delta^{1,3,5(10),9(11)}$ - pregnatetraene.

By repeating this procedure in every detail but one, namely, using 1 - methyl - 3 - methoxy - 17β - acetyl-$\Delta^{1,3,5(10),9(11)}$-estratetraene as the steroid starting material, 1 - methyl - 3 - methoxy - 20 - cycloethylenedioxy-19-nor-$\Delta^{1,3,5(10),9(11)}$-pregnatetraene was obtained.

Example VI

A stream of diborane was passed through a solution of 15 grams of 3 - methoxy - 20 - cycloethylenedioxy-19-nor-$\Delta^{1,3,5(10),9(11)}$-pregnatetraene in 375 cc. of anhydrous tetrahydrofuran for 3 hours, following which the reaction mixture was allowed to stand at room temperature overnight under anhydrous conditions. Following this reaction period excess diborane was destroyed by the addition of water, and the resulting solution was then cooled to $-5°$ C. and treated dropwise with 750 ml. of sodium hydroxide in 6 cc. of water and 90 cc. of 35% hydrogen peroxide. This mixture was stirred for one hour, then neutralized with acetic acid and extracted with methylene dichloride. The resulting extract was washed with water, dried over anhydrous sodium sulfate and evaporated to dryness. Chromatography of the resulting residue on 750 grams of washed alumina followed by crystallization of the solid fractions gave 3 - methoxy-20-cycloethylenedioxy-19-nor-$\Delta^{1,3,5(10)}$-pregnatrien-11α-ol.

By repeating this procedure in every detail but one, namely, replacing 3 - methoxy-20-cycloethylenedioxy-19-nor-$\Delta^{1,3,5(10),9(11)}$-pregnatetraene with the corresponding 1-methyl steroid, 1-methyl-3-methoxy-20-cycloethylenedioxy-19-nor-$\Delta^{1,3,5(10)}$-pregnatrien-11α-ol was obtained.

Example VII

A solution of 10 grams of 3-methoxy-20-cycloethylenedioxy - 19 - nor-$\Delta^{1,3,5(10)}$-pregnatrien-11α-ol in 200 cc. of acetone was cooled to 0° C. under an inert nitrogen atmosphere and then treated, with stirring, with an 8 N solution of chromic acid (prepared by mixing 26 grams of chromium trioxide with 23 cc. of concentrated sulfuric acid and then diluting with water to 100 cc.) until the color of the reagent persisted in the reaction mixture. At this point, the reaction mixture was stirred for an additional 5 minutes at 0–5° C. and then diluted with water. The resulting precipitate was collected by filtration, washed with water and then dried under vacuum, thus affording a crude product which, upon recrystallization from acetone/hexane, gave 3 - methoxy-20-cycloethylenedioxy-19-nor-$\Delta^{1,3,5(10)}$-pregnatrien-11-one.

This procedure was then repeated using 1-methyl-3-methoxy - 20-cycloethylenedioxy-19-nor-$\Delta^{1,3,5(10)}$-pregnatrien-11α-ol as the steroid starting material, thus giving 1-methyl - 3 - methoxy - 20 - cycloethylenedioxy-19-nor-$\Delta^{1,3,5(10)}$-pregnatrien-11-one.

Example VIII

A mixture of 5 grams of 3-methoxy-20-cycloethylenedioxy-19-nor-$\Delta^{1,3,5(10)}$-pregnatrien-11-one and 400 cc. of a 1% methanolic potassium hydroxide solution was refluxed for 24 hours under an inert nitrogen atmosphere. Following this reaction period water was added to the reaction mixture and the product was then extracted with methylene dichloride. The resulting extract was washed with water until neutral, then dried over anhydrous sodium sulfate and evaporated to dryness, thus giving 3-methoxy-20-cycloethylenedioxy - 19 - nor-9β-$\Delta^{1,3,5(10)}$-pregnatrien-11-one.

By repeating this procedure using 1-methyl-3-methoxy-20-cycloethylenedioxy - 19 - nor-$\Delta^{1,3,5(10)}$-pregnatrien-11-one as the steroid starting material, the corresponding 9β-steroid was obtained.

Example IX

A mixture of 2 grams of 3-methoxy-20-cycloethylenedioxy-19-nor-9β-$\Delta^{1,3,5(10)}$-pregnatrien - 11 - one, 2.4 cc. of ethylene glycol and 4 cc. of hydrazine hydrate was refluxed for 1 hour. Following this reaction period the reaction mixture was cooled, admixed with 2.4 grams of potassium hydroxide dissolved in 2.4 cc. of water, and then heated in an open flask until the temperature of the reaction mixture reached 200° C. At this point, a reflux condenser was attached and the reaction mixture was refluxed for 2 hours. Following this reaction period the reaction mixture was cooled, diluted with water and extracted with diethyl ether. The thus-obtained extract was washed with water, then dried over anhydrous sodium sulfate and evaporated to dryness. Chromatography of the resulting residue on neutral alumina, followed by recrystallization of the solid fractions from acetone/benzene, gave 3 - methoxy-20-cycloethylenedioxy-19-nor-9β-$\Delta^{1,3,5(10)}$-pregnatriene.

By repeating this procedure using 1-methyl-3-methoxy-20-cycloethylenedioxy - 19 - nor-9β-$\Delta^{1,3,5(10)}$-pregnatrien-11-one as the steroid starting material, 1-methyl-3-methoxy-20-cycloethylenedioxy-19-nor-9β-$\Delta^{1,3,5(10)}$ - pregnatriene was obtained.

Example X

A solution of 1.5 grams of 3-methoxy-20-cycloethylenedioxy-19-nor-9β-$\Delta^{1,3,5(10)}$-pregnatriene in 200 cc. of anhydrous diethyl ether was cooled to $-10°$ C. and then added, with stirring, to a solution of 2 grams of lithium metal in 220 cc. of liquid ammonia, and the resulting mixture was stirred for 30 minutes. At this point, 45 cc. of absolute methanol were cautiously added (until decolorization occurred) and the ammonia was then evaporated. Next, the reaction mixture was diluted with water and extracted with diethyl ether. The combined ether extracts were washed with water until neutral, dried over anhydrous sodium sulfate and evaporated to dryness, thus giving 3 - methoxy - 20 - cycloethylenedioxy - 19-nor-9β-$\Delta^{2,5(10)}$-pregnadiene.

By repeating this procedure using 1-methyl-3-methoxy-19-nor-9β-$\Delta^{1,3,5(10)}$-pregnatriene as the steroid starting material, the corresponding $\Delta^{2,5(10)}$-diene was obtained.

Example XI

The 3 - methoxy - 20 - cycloethylenedioxy - 19 - nor-9β-$\Delta^{2,5(10)}$-pregnadiene prepared as described in Example X hereinabove, dissolved in 60 cc. of methanol, was admixed with 30 cc. of 3 N hydrochloric acid, and the resulting reaction mixture was refluxed for 45 minutes. Following this reaction period the reaction mixture was poured into water and extracted with ethyl acetate. The resulting extract was washed with water until neutral, dried over anhydrous sodium sulfate and evaporated to dryness. Chromatography of the residue on 75 grams of washed alumina gave 19-nor-9β,10α-Δ⁴-pregnene-3,20-dione (19-nor-9β,10α-progesterone).

By repeating this procedure using the 1-methyl-Δ$^{2,5(10)}$-diene prepared as described in Example X hereinabove as the steroid starting material, 1α-methyl-19-nor-9β,10α-Δ⁴-pregnene-3,20-dione (1α-methyl-19-nor-9β,10α-progesterone) was obtained.

Example XII

A solution of 1 gram of 3-methoxy-20-cycloethylenedioxy-19-nor-9β-Δ$^{1,3,5(10)}$-pregnatrien-11-one in 30 cc. of anhydrous tetrahydrofuran was slowly added, with stirring, to a suspension of 1 gram of lithium aluminum hydride in 50 cc. of anhydrous tetrahydrofuran, and the resulting reaction mixture was refluxed for 2 hours. Following this reaction period the reaction mixture was cooled and excess lithium aluminum hydride was destroyed by the addition of 5 cc. of ethyl acetate and 2 cc. of water. Next, a saturated solution of sodium sulfate and solid sodium sulfate were added, the inorganic material was filtered off and washed with hot ethyl acetate, and these washings were added to the filtrate. The filtrate was then evaporated to dryness and the resulting residue was crystallized from acetone/hexane, thus giving a mixture of 3-methoxy-20-cycloethylenedioxy-19-nor-9β-Δ$^{1,3,5(10)}$-pregnatrien-11α-ol and 3-methoxy-20-cycloethylenedioxy-19-nor-9β-Δ$^{1,3,5(10)}$-pregnatriene-11β-ol.

This procedure was then repeated using 1-methyl-3-methoxy-20-cycloethylenedioxy-19-nor-9β-Δ$^{1,3,5(10)}$-pregnatrien-11-one as the steroid starting material, thus giving a mixture of 1-methyl-3-methoxy-20-cycloethylenedioxy-19-nor-9β-Δ$^{1,3,5(10)}$-pregnatrien-11α-ol and 1-methyl-3-methoxy-20-cycloethylenedioxy-19-nor-9β-Δ$^{1,3,5(10)}$-pregnatrien-11β-ol.

Example XIII

By repeating the procedure of Example X hereinabove using the mixtures of 11α- and 11β-ols prepared as described in Example XII hereinabove, the corresponding Δ$^{2,5(10)}$-dienes, namely, 3-methoxy-20-cycloethylenedioxy-19-nor-9β-Δ$^{2,5(10)}$-pregnadien-11(α and β)-ol and 1-methyl-3-methoxy-20-cycloethylenedioxy-19-nor-9β-Δ$^{2,5(10)}$-pregnadien-11(α and β)-ol, respectively, were obtained.

Example XIV

By repeating the procedure of Example XI hereinabove using the mixtures of Δ$^{2,5(10)}$-dien-11(α and β)-ols prepared as described in Example XIII hereinabove as the steroid starting materials, the corresponding 19-nor-9β,10α-steroids, namely, 19-nor-9β,10α-Δ⁴-pregnen-11α-ol-3,20-dione and 19-nor-9β,10α-Δ⁴-pregnen-11β-ol-3,20-dione, and 1α-methyl-19-nor-9β,10α-Δ⁴-pregnen-11α-ol-3,20-dione and 1α-methyl-19-nor-9β,10α-Δ⁴-pregnen-11β-ol-3,20-dione, respectively, were obtained, and these mixtures were then separated into the individual 11α- and 11β-ols by chromatography on alumina.

Example XV 19-nor-9β,10α-Δ⁴-pregnen-11β-ol-3,20-dione and 1α-methyl-19-nor-9β,10α-Δ⁴-pregnen-11β-ol-3,20-dione were oxidized, using 8 N chromic acid in acetone in the manner described in Example VII hereinabove, thus giving 19-nor-9β,10α-Δ⁴-pregnene-3,11,20-trione and 1α-methyl-19-nor-9β,10α-Δ⁴-pregnene-3,11,20-trione, respectively.

Example XVI

Ten grams of 3-methoxy-19-nor-Δ$^{1,3,5(10),9(11)}$-pregnatetraen-20-one were converted into the corresponding 20-ketal, i.e., 3-methoxy-20-cycloethylenedioxy-19-nor-Δ$^{1,3,5(10),9(11)}$-pregnatetraene, by reaction with ethylene glycol in benzene solution in the presence of p-toluenesulfonic acid in the manner described in Example V hereinabove.

The thus-obtained 20-ketal was treated with diborane, and then with alkaline hydrogen peroxide, in the manner described in Example VI hereinabove, thus giving 3-methoxy-20-cycloethylenedioxy-19-nor-Δ$^{1,3,5(10)}$-pregnatrien-11α-ol.

This 11α-ol, dissolved in 400 cc. of anhydrous acetone, was admixed with 0.5 gram of anhydrous p-toluenesulfonic acid, and the resulting reaction mixture was allowed to stand at room temperature for 24 hours. Following this reaction period the reaction mixture was diluted with water and extracted with methylene dichloride. The resulting extract was washed with aqueous sodium bicarbonate solution and then with water until neutral, then dried over anhydrous sodium sulfate and evaporated to dryness. Crystallization of the residue from acetone/hexane gave 3-methoxy-19-nor-Δ$^{1,3,5(10)}$-pregnatrien-11α-ol-20-one.

By repeating this procedure in every detail but one, namely, replacing 3-methoxy-19-nor-Δ$^{1,3,5(10),9(11)}$-pregnatetraen-20-one with the corresponding 1-methyl steroid, 1-methyl-3-methoxy-19-nor-Δ$^{1,3,5(10)}$-pregnatrien-11α-ol-20-one was obtained.

Example XVII

A mixture of 6.6 grams of 3-methoxy-19-nor-Δ$^{1,3,5(10)}$-pregnatrien-11α-ol-20-one, 2.7 grams of p-toluenesulfonic acid and 300 cc. of acetic anhydride was slowly distilled for 5 hours. Following this reaction period the reaction mixture was cooled, diluted with water and extracted with diethyl ether. The thus-obtained extract was washed with an aqueous sodium bicarbonate solution and then with water until neutral, then dried over anhydrous sodium sulfate and evaporated to dryness under reduced pressure, thus giving 3-methoxy-19-nor-Δ$^{1,3,5(10),17(20)}$-pregnatetraene-11α,20-diol 11,20-diacetate, which was used in the next step without further purification.

Six grams of this crude diacetate were admixed with 1.1 molar equivalents of perbenzoic acid in benzene solution, and the resulting reaction mixture was allowed to stand at room temperature in the dark for 20 hours. Following this reaction period the reaction mixture was diluted with water and the organic layer was separated, washed with aqueous sodium bicarbonate and then with water until neutral, then dried over anhydrous sodium sulfate and evaporated to dryness.

The resulting crude 17,29-oxido compound was treated with 50 cc. of a 1/ methanolic potassium hydroxide solution, and the resulting reaction mixture was allowed to stand at room temperature for 1 hour. Following this reaction period the reaction mixture was neutralized with acetic acid, then concentrated to a small volume under reduced pressure. Next, the product was precipitated by the addition of ice water, and was removed by filtration, washed with water and dried. Recrystallization from acetone/methanol gave 3-methoxy-19-nor-Δ$^{1,3,5(10)}$-pregnatriene-11α,17α-diol-20-one.

This procedure was then repeated using 1-methyl-3-methoxy-19-nor-Δ$^{1,3,5(10)}$-pregnatrien-11α-ol-20-one as the steroid starting material, thus giving 1-methyl-3-methoxy-19-nor-Δ$^{1,3,5(10)}$-pregnatriene-11α,17α-diol-20-one.

Example XVIII 3-methoxy-19-nor-Δ$^{1,3,5(10)}$-pregnatriene-11α,17α-diol-20-one and 1-methyl-3-methoxy-19-norΔ$^{1,3,5(10)}$-pregnatriene-11α,17α-diol-20-one were ketalized in the manner described in Example V hereinabove, thus giving 3-methoxy-20-cycloethylenedioxy-19-nor-Δ$^{1,3,5(10)}$-pregnatriene-11α,17α-diol and 1-methyl-3-methoxy-20-cycloethylenedioxy-19-nor-Δ$^{1,3,5(10)}$-pregnatriene-11α,17α-diol.

Example XIX

A solution of 4 grams of 3-methoxy-20-cycloethylenedioxy-19-nor-Δ$^{1,3,5(10)}$-pregnatriene-11α,17α-diol in 80 cc. of pyridine was added to a mixture of 4 grams of chromium trioxide in 80 cc. of pyridine, and the resulting reaction mixture was allowed to stand at room temperature overnight. Following this reaction period the reaction mixture was diluted with ethyl acetate, then filtered through Celite. The filtrate was thoroughly washed with water, then dried over anhydrous sodium sulfate and evaporated to dryness. Crystallization from actone/hexane gave 3-methoxy - 20 - cycloethylenedioxy-19-nor-$\Delta^{1,3,5(10)}$-pregnatrien-17α-ol-11-one.

By repeating this procedure using 1-methyl-3-methoxy-20 - cycloethylenedioxy-19-nor$\Delta^{1,3,5(10)}$-pregnatriene-11α, 17α-diol as the steroid starting material, 1-methyl-3-methoxy - 20-cycloethylenedioxy-19-nor-$\Delta^{1,3,5(10)}$-pregnatrien-17α-ol-11-one was obtained.

Example XX

3 - methoxy - 20-cycloethylenedioxy-19-nor-$\Delta^{1,3,5(10)}$-pregnatrien-17α-ol-11-one and 1-methyl-3-methoxy-20-cycloethylenedioxy - 19-nor-$\Delta^{1,3\ 5(10)}$-pregnatrien-17α-ol-11-one were isomerized, using methanolic potassium hydroxide in the manner described in Example VIII hereinabove, thus giving 3-methoxy-20-cycloethylenedioxy-19-nor-9β-$\Delta^{1,3,5(10)}$-pregnatrien-17α-ol-11-one and 1-methyl-3 - methoxy - 20-cycloethylenedioxy-19-nor-9β-$\Delta^{1,3,5(10)}$-pregnatrien-17α-ol-11-one.

Example XXI

3 - methoxy-20-cycloethylenedioxy-19-nor-9β$\Delta^{1,3,5(10)}$-pregnatrien-17α-ol-11-one and 1-methyl-3-methoxy-20-cycloethylenedioxy - 19 - nor-9β-$\Delta^{1,3,5(10)}$-pregnatrien-17α-ol-11-one were subjected to the Wolff-Kishner reaction in the manner described in Example IX hereinabove, thus giving 3-methoxy-20-cyclothylenedioxy-19-nor-9β-$\Delta^{1,3,5(10)}$-pregnatrien-17α-ol and 1-methyl-3-methoxyl-3-methoxy - 20 - cycloethylenedioxy - 19-nor - 9β-$\Delta^{1,3,5(10)}$-pregnatrien-17α-ol.

Example XXII

3 - methoxy-20-cycloethylenedioxy-19-nor-9β-$\Delta_5,^{3,5(10)}$-pregnatrien-17α-ol and 1-methyl-3-methoxy-20-cycloethylenedioxy - 19 - nor-9β-$\Delta^{1,3,5(10)}$-pregnatrien-17α-ol were treated with lithium in liquid ammonia in the manner described in Example X hereinabove, thus giving 3-methoxy - 20 - cycloethylenedioxy-19-nor-9β-$\Delta^{2,5(10)}$-pregnadien-17α-ol and 1-methyl-3-methoxy-20-cycloethylenedioxy-19-nor-9β-$\Delta^{2,5(10)}$-pregnadien-17α-ol.

Example XXIII

3 - methoxy - 20-cycloethylenedioxy-19-nor-9β-$\Delta^{2,5(10)}$-pregnadien-17α-ol and 1-methyl-3-methoxy-20-cycloethylenedioxy-19-nor-9β-$\Delta^{2,5(10)}$-pregnadien-17α-ol were hydrolyzed in the manner described in Example XI hereinabove, thus giving 19-nor-9β,10α-$\Delta^4$-pregnen-17α-ol-3,20-dione and 1α-methyl-19-nor-9β,10α-$\Delta^4$-pregnen-17α-ol-3,20-dione.

Example XXIV

3 - methoxy-20-cycloethylenedioxy-19-nor-9β-$\Delta^{1,3,5(10)}$-pregnatrien-11-one and 1-methyl-3-methoxy-20-cycloethylenedioxy-19-nor-9β-$\Delta^{1,3,5(10)}$-pregnatrien-11-one were treated with lithium aluminum hydride in tetrahydrofuran in the manner described in Example XII hereinabove, thus giving mixtures of the corresponding 11α- and 11β-ols, i.e., 3 - methoxy-20-cycloethylenedioxy-19-nor-9β-$\Delta^{1,3,5(10)}$ pregnatriene-11(α and β), 17α-diol and 1-methyl-3-methoxy - 20 - cycloethylenedioxy - 19-nor-9β-$\Delta^{1,3,5(10)}$-pregnatriene-11(α and β), 17α-diol.

Example XXV

By repeating the procedure of Example X hereinabove using the mixtures of 11α- and 11β-ols prepared as described in Example XXIV hereinabove, the corresponding $\Delta^{2,5(10)}$-dienes, namely, 3-methoxy-20-cycloethylenedioxy-19-nor-9β-$\Delta^{2,5(10)}$-pregnadiene-11(α and β), 17α-diol and 1 - methyl - 3-methoxy - 20-cycloethylenedioxy-19-nor-9β-$\Delta^{2,5(10)}$-pregnadiene-11(α and β),17α-diol, respectively, were obtained.

Example XXVI

By repeating the procedure of Example XI hereinabove using the mixtures of $\Delta^{2,5(10)}$-diene-11(α and β),17α-diols prepared as described in Example XXV hereinabove as the steroid starting materials, the corresponding 19-nor-9β,10α steroids, namely, 19-nor-9β,10α-$\Delta^4$-pregnene-11α, 17α-diol-3,20-dione and 19-nor-9β,10α-$\Delta^4$-pregnene-11β, 17α - diol - 3,20-dione, and 1α-methyl-19-nor-9β,10α-$\Delta^4$-pregnene-11α,17α-diol-3,20-dione and 1α-methyl-19-nor-9β,10α-$\Delta^4$-pregnene-11β,17α-diol-3,20-dione, respectively, were obtained, and these mixtures were then separated into the individual 11α- and 11β-ols by chromatography on alumina.

Example XXVII

To a solution of 2 grams of 19-nor-9β,10α-$\Delta^4$-pregnen-17α-ol-3,20-dione in 40 cc. of anhydrous benzene there were added 400 mg. of p-toluenesulfonic acid and 4 cc. of acetic anhydride, and the resulting reaction mixture was allowed to stand at room temperature for 24 hours. Following this reaction period the reaction mixture was poured into ice water and stirred to effect hydrolysis of excess acetic anhydride. Next, the benzene layer was separated, washed with an aqueous 10% sodium carbonate solution and then with water, then dried over anhydrous sodium sulfate and evaporated to dryness. Crystallization of the residue from diethyl ether/hexane gave 19-nor-9β,10α-$\Delta^{3,5}$-pregnadiene-3,17α-diol-20-one 3,17-diacetate admixed with a minor amount of 19-nor-9β,10α-$\Delta^{3,5}$-pregnadiene-3,17α-diol 3-acetate.

One gram of the thus-obtained mixture was dissolved in 50 ml. of methanol and admixed with 1 ml. of concentrated hydrochloric acid, and the resulting reaction mixture was then refluxed for 2 hours. Following this reaction period the reaction mixture was cooled, neutralized with aqueous sodium bicarbonate solution and diluted with water. The resulting precipitate was collected by filtration, washed with water and dried. Chromatography on alumina followed by recrystallization from diethyl ether/hexane gave 19-nor-9β,10α-$\Delta^4$-pregnen-17α-ol-3,20-dione 17-acetate.

By repeating this procedure in every detail but one, namely, replacing acetic anhydride with propionic, caproic and enanthic anhydrides, the corresponding 17-propionate, -caproate and -enanthate of 19-nor-9β,10α-$\Delta^4$-pregnen-17α-ol-3,20-dione were obtained.

Similarly, by replacing 19-nor-9β,10α-$\Delta^4$-pregnen-17α-ol-3,20-dione with 1α-methyl-19-nor-9β,10α-$\Delta^4$-pregnen-17α-ol-3,20-dione and using each of the anhydrides mentioned hereinabove, the 17-acetate, -propionate, -caproate and -enanthate of 1α-methyl-19-nor-9β,10α-$\Delta^4$-pregnen-17α-ol-3,20-dione were obtained.

Example XXVIII 19-nor-9β,10α-$\Delta^4$-pregnene-11β,17α-diol-3,20-dione was acetylated with acetic anhydride in benzene solution in the presence of p-toluenesulfonic acid, and the resulting acetylated mixture was hydrolyzed in methanolic concentrated hydrochloric acid, each of these reactions being carried out in the manner described in Example XXVII hereinabove, to give 19-nor-9β,10α-$\Delta^4$-pregnene-11β,17α-diol-3,20-dione 11,17-diacetate.

Two grams of the thus-obtained 11,17-diacetate were dissolved in 50 cc. of methanol and admixed with 5 cc. of an aqueous 4% solution of potassium hydroxide. The resulting reaction mixture was then stirred for 1 hour at 0° C. under an inert nitrogen atmosphere. Following this reaction period the reaction mixture was neutralized with acetic acid and the methanol distilled off under reduced pressure. The resulting residue was triturated with water and the solid was then collected by filtration, washed with water and dried. Recrystallization from ethyl acetate/methanol gave 19-nor-9β,10α-$\Delta^4$-pregnene-11β,17α-diol-3,20-dione 17-acetate.

By repeating this procedure in every detail but one, namely, replacing acetic anhydride with propionic, caproic and enanthic anhydrides, the corresponding 17-propionate, -caproate and -enanthate of 19-nor-9β,10α-$\Delta^4$-pregnene-11β,17α-diol-3,20-dione were obtained.

Similarly, by replacing 19-nor-9β,10α-Δ⁴-pregnene-11β, 17α-diol-3,20-dione with 1α-methyl-19-nor-9β,10α-Δ⁴-pregnene-11β,17α-diol-3,20-dione and using each of the anhydrides mentioned hereinabove, the corresponding 17-acetate, -propionate, -caproate and -enanthate of 1α-methyl-19-nor-9β,10α-Δ⁴-pregnene-11β,17α-diol-3,20-dione were obtained.

*Example XXIX*

19-nor-9β,10α-Δ⁴-pregnene-11β,17α-diol-3,20-dione 17-acetate and 1α-methyl-19-nor-Δ⁴-pregnene-11β,17α-dione 17-acetate were oxidized, using 8 N chromic acid in acetone solution in the manner described in Example VII hereinabove, thus giving 19-nor-9β,10α-Δ⁴-pregnen-17α-ol-3,11,20-trione 17-acetate and 1α-methyl-19-nor-9β,10α-Δ⁴-pregnen-17α-ol-3,11,20-trione 17-acetate respectively.

By repeating this procedure using the 17-propionates, -caproates and -enanthates prepared as described in Example XXVIII hereinabove as the steroid starting materials, the corresponding 11-ones, namely, 19-nor-9β,10α-Δ⁴-pregnen-17α-ol-3,11,20-trione 17-propionate, 19-nor-9β,10α-Δ⁴-pregnen-17α-ol-3,11,20-trione 17-caproate, 19-nor-9β,10α-Δ⁴-pregnen-17α-ol-3,11,20-trione 17-enanthate, 1α-methyl-19-nor-9β,10α-Δ⁴-pregnen-17α-ol-3,11,20-trione 17-propionate, 1α-methyl-19-nor-9β,10α-Δ⁴-pregnen-17α-ol-3,11,20-trione 17-caproate, and 1α-methyl-19-nor-9β,10α-Δ⁴-pregnene-17α-ol-3,11,20-trione 17-enanthate, respectively, were obtained.

*Example XXX*

A solution of 0.17 gram of potassium hydroxide in 0.2 cc. of water and 2.5 cc. of methanol was added, with stirring over a 30 minute period, to a boiling solution of 1 gram of 19-nor-9β,10α-Δ⁴-pregnen-17α-ol-3,11,20-trione 17-acetate in 30 cc. of methanol, contained under an inert nitrogen atmosphere, and boiling was then continued for 2 hours. Following this reaction period the reaction mixture was cooled to room temperature, neutralized with acetic acid and concentrated under reduced pressure. The addition of water to the concentrate, followed by crystallization of the precipitated solid from acetone/hexane, gave 19-nor-9β,10α-Δ⁴-pregnen-17α-ol-3,11,20-trione.

By repeating this procedure using 1α-methyl-19-nor-9β,10α-Δ⁴-pregnen-17α-ol-3,11,20-trione 17-acetate as the steroid starting material, 1α-methyl-19-nor-9β,10α-Δ⁴-pregnen-17α-ol-3,11,20-trione was obtained.

*Example XXXI*

17β-acetyl-Δ¹,³,⁵(¹⁰),⁹(¹¹)-estratetraen-3-ol and 1-methyl-17β-acetyl-Δ¹,³,⁵(¹⁰),⁹(¹¹)-estratetraen-3-ol were treated with ethylene glycol in benzene solution in the presence of p-toluenesulfonic acid in the manner described in Example V hereinabove, thus giving 20-cycloethylenedioxy-19-nor-Δ¹,³,⁵(¹⁰),⁹(¹¹)-pregnatetraen-3-ol and 1-methyl-20-cycloethylenedioxy-10-nor-Δ¹,³,⁵(¹⁰),⁹(¹¹)-pregnatetraen-3-ol, respectively.

*Example XXXII*

The 20-ketals prepared as described in Example XXXI hereinabove were treated with diborane and then with alkaline hydrogen peroxide in the manner described in Example VI hereinabove, thus giving 20-cycloethylenedioxy-19-nor-Δ¹,³,⁵(¹⁰)-pregnatriene-3,11α-diol and 1α-methyl-20-cycloethylenedioxy-19-nor-Δ¹,³,⁵(¹⁰)-pregnatriene-3,11α-diol, respectively.

*Example XXXIII*

The 20-cycloethylenedioxy-3,11α-diols prepared as described in Example XXXII hereinabove were hydrolyzed, using p-toluenesulfonic acid in acetone, in the manner described in Example XVI hereinabove, thus giving 19-nor-Δ¹,³,⁵(¹⁰)-pregnatriene-3,11α-diol-20-one and 1-methyl-19-nor-Δ¹,³,⁵(¹⁰)-pregnatriene-3,11α-diol-20-one, respectively.

By subjecting the thus-obtained 20-ones to the remaining reactions described in Example XVI hereinabove, 19-nor-Δ¹,³,⁵(¹⁰)-pregnatriene-3,11α,17α-triol-20-one and 1-methyl-19-nor-Δ¹,³,⁵(¹⁰)-pregnatriene-3,11α,17α-triol-20-one, respectively, were obtained.

*Example XXXIV*

The 3,11α,17α-triol-20-ones prepared as described in Example XXXIII hereinabove were treated with ethylene glycol in benzene solution in the precense of p-toluenesulfonic acid in the manner described in Example V hereinabove, thus giving 20-cycloethylenedioxy-19-nor-Δ¹,³,⁵(¹⁰)-pregnatriene-3,11α,17α-triol and 1-methyl-20-cycloethylenedioxy-19-nor-Δ¹,³,⁵(¹⁰)-pregnatriene-3,11α,17α-triol, respectively.

*Example XXXV*

One gram of 20-cycloethylenedioxy-19-nor-Δ¹,³,⁵(¹⁰)-pregnatriene-3,11α,17α-triol in 100 ml. of an aqueous 10% solution of sodium hydroxide was admixed, at room temperature with stirring, with 20 molar equivalents of benzoyl chloride. The resulting precipitate was collected by filtration, washed with water until neutral and recrystallized from acetone/hexane, thus giving 20-cycloethylenedioxy-19-nor-Δ¹,³,⁵(¹⁰)-pregnatriene-3,11α,17α-triol 3-benzoate.

By repeating this procedure using 1-methyl-20-cycloethylenedioxy-19-nor-Δ¹,³,⁵(¹⁰)-pregnatriene-3,11α,17α-triol as the steroid starting material, 1-methyl-20-cycloethylenedioxy-19-nor-Δ¹,³,⁵(¹⁰)-pregnatriene-3,11α17α-triol 3-benzoate was obtained.

*Example XXXVI*

The 3-benzoates prepared as described in Example XXXV hereinabove were oxidized with chromium trioxide in pyridine in the manner described in Example XIX hereinabove, thus giving 20-cycloethylenedioxy-19-nor-Δ¹,³,⁵(¹⁰)-pregnatriene-3,17α-diol-11-one 3-benzoate and 1-methyl-20-cycloethylenedioxy-19-nor-Δ¹,³,⁵(¹⁰)-pregnatriene-3,17α-diol-11-one 3-benzoate, respectively.

*Example XXXVII*

The 11-ones prepared as described in Example XXXVI hereinabove were isomerized in the manner described in Example VIII hereinabove, thus giving 20-cycloethylenedioxy-19-nor-9β-Δ¹,³,⁵(¹⁰)-pregnatriene-3,17α-diol-11-one and 1-methyl-20-cycloethylenedioxy-19-nor-9β-Δ¹,³,⁵(¹⁰)-pregnatriene-3,17α-diol-11-one, respectively.

*Example XXXVIII*

The 9β-steroids prepared as described in Example XXXVII hereinabove were treated with dimethyl sulfate in the presence of potassium hydroxide in the manner described in Example IV hereinabove, thus giving 3-methoxy-20-cycloethylenedioxy-19-nor-9β-Δ¹,³,⁵(¹⁰)-pregnatrien-17α-ol-11-one and 1-methyl-3-methoxy-20-cycloethylenedioxy-19-nor-9β-Δ¹,³,⁵(¹⁰)-pregnatrien-17α-ol-11-one, respectively, which were identical to the compounds prepared as described in Example XX hereinabove.

*Example XXXIX*

A solution of 1.6 grams of 6α-methyl-19-nor-9β,10α-Δ⁴-pregnene-17α,21-diol-3,20-dione in 8 cc. of pyridine was cooled to 0° C., then admixed with 0.8 gram of tosyl chloride. The resulting reaction mixture was held at 0° C. for 16 hours, then diluted with 100 cc. of chloroform, washed successively with dilute hydrochloric acid, water, aqueous sodium bicarbonate solution and again with water, then dried over anhydrous sodium sulfate and evaporated to dryness under reduced pressure, thus giving the crude 21-tosylate of 6α-methyl-19-nor-9β,10α-Δ⁴-pregnene-17α, 21-diol-3,20-dione.

A solution of 1.5 grams of the above-prepared crude 21-tosylate in 60 cc. of glacial acetic acid was admixed with 4 grams of sodium iodide, and the resulting reaction mixture was then refluxed for 2 hours. Following this reaction period the reaction mixture was poured into ice water and extracted several times with methylene dichloride. The extracts were then combined, washed with an aqueous sodium carbonate solution, then with an aqueous sodium sulfite solution and finally with water, then dried over anhydrous sodium sulfate and evaporated to dryness under reduced pressure. Crystallization of the resulting residue from acetone/hexane gave 6α-methyl-19-nor-9β,10α-Δ$^4$-pregnen-17α-ol-3,20-dione.

By repeating this procedure using 16α-methyl-19-nor-9β,10α-Δ$^4$-pregnene-17α,21-diol-3,20-dione 16β-methyl-19-nor-9β,10α-Δ$^4$-pregnene-17α,21-diol-3,20-dione, 6α,6α-dimethyl-19-nor-9β,10α-Δ$^4$-pregnene - 17α,21 - diol - 3,20-dione, and 6α,16β-dimethyl-19-nor-9β,10α-Δ$^4$-pregnene-17α,21-diol-3,20-dione,, respectively, as the steriod starting materials, the corresponding 21-desoxy steroids, namely, 16α - methyl - 19 - nor-9β,10α-Δ$^4$-pregnen-17α-ol-3,-20-dione, 16β-methyl-19-nor-9β,10α-Δ$^4$-pregnen-17α-ol-3,20-dione, 6α,16α - dimethyl-19-nor-9β,10α-Δ$^4$-pregnen-17α-ol-3,20-dione, and 6α,16β-dimethyl-19-nor-9β,10α-Δ$^4$-pregnen-17α-ol-3,20-dione, respectively, were obtained.

*Example XL*

The 17α-hydroxy-21-desoxy steroids prepared as described in Example XXIX hereinabove were esterified with acetic, propionic, cyclopentylpropionic, caproic, enanthic and undecenoic anhydrides in the manner described in Example XXVII hereinabove, thus giving the corresponding 17-acetates, -propionates, -cyclopentylpropionates, -caproates, -enanthates and -undecenoates.

*Example XLI*

A solution of 1 gram of 6α-methyl-19-nor-9β,10α-Δ$^4$-pregnen-17α-ol-3,20-dione in 80 cc. of 80% acetic acid was admixed with 50 grams of zinc dust, and the resulting reaction mixture was refluxed for 10 hours. Following this reaction period the zinc was removed by filtration and the filtrate was then diluted with water. The thus-formed precipitate was collected by filtration, washed with water and then crystallized with hexane/diethyl ether, thus giving 6α-methyl-19-nor-9β,10α-Δ$^4$-pregnene-3,20-dione.

By repeating this procedure using the remaining 17α-hydroxy-21-desoxy steroids obtained as described in Example XXXIX hereinabove as the steroid starting materials, the corresponding 17-desoxy compounds, namely, 16α-methyl-19-nor-9β,10α-Δ$^4$-pregnene - 3,20 - dione, 16β-methyl-19-nor-9β,10α-Δ$^4$-pregnene - 3,20 - dione, 6,16α-dimethyl-19-nor-9β,10α - Δ$^4$ - pregnene - 3,20 - dione, and 6α,16β-dimethyl - 19 - nor-9β,10α-Δ$^4$-pregnene-3,20-dione, respectively, were obtained.

*Example XLII*

The following solutions A, B and C were prepared using distilled water as the solvent.

Solution A was prepared by mixing 425 cc. of a 1.742% dipotassium hydrogen phosphate (K$_2$HPO$_4$) solution with 75 cc. of a 1.38% monosodium dihydrogen phosphate (NaH$_2$PO$_4$) solution.

Solution B was prepared by diluting a mixture of 1 liter of a 4.5% sodium chloride solution, 40 cc. of a 5.75% potassium chloride solution and 10 cc. of a 19.1% magnesium sulfate solution to a volume of 5 liters.

Solution C was prepared by dissolving 20.9 grams of fumaric acid and 14.4 grams of sodium hydride in 1 liter of water and then diluting the solution to 1.2 liters.

Then, 475 cc. of solution A, 4.32 liters of solution B and all of solution C were mixed.

Defatted adrenal glands of recently slaughtered cattle were ground in a meat grinder until a homogeneous mass was obtained. To 1 kilogram of this homogeneous mass there was then added, with vigorous stirring, 2 liters of the mixture of solutions A, B and C, followed by 1 gram of 6α - methyl - 19 - nor-9β,10α-Δ$^4$-pregnene-3,20-dione dissolved in 5.35 parts by weight, based on the weight of the steroid, of propylene glycol. The resulting mixture was stirred at 37° C. for 3 hours, following which 13 liters of acetone were added and the mixture was stirred at room temperature for an additional hour. At this point, the acetone extract was separated by filtration, the filter cake was washed with 6 liters of acetone, the washings were combined with the filtrate, and the solvent was then removed by distillation under reduced pressure. Chromatography on alumina followed by crystallization of the solid fractions from methylene dichloride/acetone gave 6α-methyl-19-nor-9β,10α-Δ$^4$-pregnen-11β-ol-3,20-dione.

By repeating this procedure using the remaining 17-desoxy compounds prepared as described in Example XXXI hereinabove as steroid starting materials, the corresponding 11β-hydroxy steroids, namely, 16α-methyl-19-nor-9β,10α-Δ$^4$-pregnen-11β-ol-3,20-dione, 16β-methyl-19-nor-9β,10α-Δ$^4$-pregnen - 11β - ol - 3,20 - dione, 6α,16α-dimethyl-19-nor-9β,10α-Δ$^4$-pregnen-11β-ol-3,20-dione, and 6α,16β - dimethyl-19-nor-9β,10α-Δ$^4$-pregnen-11β-ol-3,20-dione, respectively, were obtained.

*Example XLIII*

The 11β-hydroxy steroids prepared as described in Example XLII were oxidized, using 8 N chromic acid in acetone solution in the manner described in Example VII hereinabove, thus giving 6α-methyl-19-nor-9β,10α-Δ$^4$-pregnene - 3,11,20 - trione, 16α-methyl-19-nor-9β,10α-Δ$^4$-pregnene - 3,11,20 - trione, 16β-methyl-19-nor-9β,10α-Δ$^4$-pregnene - 3,11,20-trione, 6α,16α-dimethyl-19-nor-9β,10α-Δ$^4$-pregnene-3,11,20,-trione, and 6α,16β-dimethyl-19-nor-9β,10α-Δ$^4$-pregnene-3,11,20-trione, respectively.

*Example XLIV*

By reducing
6α-methyl-19-nor-9β,10α-Δ$^4$-pregnene-11β,17α,21-triol-3,20-dione,
16α-methyl-19-nor-9β,10α-Δ$^4$-pregnene-11β,17α,21-triol-3,20-dione,
16β-methyl-19-nor-9β,10α-Δ$^4$-pregnene-11β,17α,21-triol-3,20-dione,
6α,16α-dimethyl-19-nor-9β,10α-Δ$^4$-pregnene-11β,17α,21-triol-3,20-dione, and
6α,16β-dimethyl-19-nor-9β,10α-Δ$^4$-pregnene-11β,17α,21-triol-3,20-dione, respectively, in the manner described in Example XXXIX hereinabove, the corresponding 21-desoxy steroids, namely,
6α-methyl-19-nor-9β,10α-Δ$^4$-pregnene-11β,17α-diol-3,20-dione,
16α-methyl-19-nor-9β,10α-Δ$^4$-pregnene-11β,17α-diol-3,20-dione,
16β-methyl-19-nor-9β,10α-Δ$^4$-pregnene-11β,17α-diol-3,20-dione,
6α,16α-dimethyl-19-nor-9β,10α-Δ$^4$-pregnene-11β,17α-diol-3,20-dione, and
6α,16β-dimethyl-19-nor-9β,10α-Δ$^4$-pregnene-11β,17α-diol-3,20-dione, respectively, were obtained.

*Example XLV*

The 11β,17α - dihydroxy-21-desoxy steroids prepared as described in Example XLIV hereinabove were esterified with acetic, propionic, cyclopentylpropionic, caproic, enanthic and undecenoic anhydrides in the manner described in Example XXVIII hereinabove, thus giving the corresponding 17-acetates, -propionates, -cyclopentylpropionates, -caproates, -enanthates and -undecenoates, respectively.

*Example XLIV*

6α-methyl-19-nor-9β,10α-Δ$^4$-pregnene-11β,17α-diol-3,20-dione 17-acetate;
16α-methyl-19-nor-9β,10α-Δ$^4$-pregnene-11β,17α-diol-3,20-dione 17-acetate;
16β-methyl-19-nor-9β,10α-Δ$^4$-pregnene-11β,17α-diol-3,20-dione 17-acetate;

6α,16α-dimethyl-19-nor-9β,10α-Δ⁴-pregnene-11β,
17α-diol-3,20-dione 17-acetate and 6α,
16β-dimethyl-19-nor-9β,10α-Δ⁴-pregnene-11β,17α-diol-3,
20-dione 17-acetate were oxidized, using 8 N chromic
acid in acetone solution in the manner described in
Example VII hereinabove, thus giving 6α-methyl-19-nor-9β,10α-Δ⁴-pregnen-17α-ol-3,11,20-
trione 17-acetate,
16αmethyl-19-nor-9β,10α-Δ⁴-pregnen-17α-ol-3,11,20-
trione 17-acetate,
16β-methyl-19-nor-9β,10α-Δ⁴-pregnen-17α-ol-3,11,
20-trione 17-acetate,
6α,16α-dimethyl-19-nor-9β,10α-Δ⁴-pregnen-17α-ol-3,
11,20-trione 17- acetate, and
6α,16β-dimethyl-19-nor-9β,10α-Δ⁴-pregnen-17α-ol-3,
11,20-trione 17-acetate, respectively.

*Example XLVII*

The 11-one-17-acylates prepared as described in Example XLVI hereinabove were hydrolyzed in the manner described in Example XXX hereinabove, thus giving 6α-methyl-19-nor-9β,10αΔ⁴-pregnen-17α-ol-3,11,20-trione,
16α-methyl-19-nor-9β,10α-Δ⁴-pregnen-17α-ol-3,11,20-
trione,
16β-methyl-19-nor-9β,10α-Δ⁴-pregnen-17α-ol-3,11,20-
trione,
6α16α-dimethyl-19-nor-9β,10α-Δ⁴-pregnen-17α-ol-3,
11,20-trione, and
6α,16β-dimethyl-10-nor-9β,10α-Δ⁴-pregnen-17α-ol-3,
11,20-trione, respectively.

It will be obvious to those skilled in the art that other changes and variations can be made in carrying out the present invention without departing from the spirit and scope thereof as defined in the appended claims.

We claim:
1. 19-nor-9β,10α-Δ⁴-pregnen-17α-ol-3,11,20-trione.
2. 6α,16α-dimethyl-19nor-9β,10α-Δ⁴-pregnene-3,20-dione.
3. 6α-methyl-19-nor-9β,10α-Δ⁴-pregnen-17α-ol-3, 20-dione.
4. 6α-methyl-19-nor-9β,10α-Δ⁴-pregnen-17α-ol-3, 20-dione 17- acetate.
5. 6α,16α-dimethyl-19-nor-9β,10α-Δ⁴-pregnen-17α-ol-3,20-dione.
6. 6α,16α-dimethyl-19-nor-9β,10α-Δ⁴-pregnen-17α-ol-3,20-dione 17-acetate.
7. 6α-methyl-19-nor-9β,10α-Δ⁴-pregnen-11β-ol-3, 20-dione.
8. 6α-methyl-19-nor-9β,10α-Δ⁴-pregnene-3,11,20-trione.
9. 6α-methyl-19-nor-9β,10α-Δ⁴-pregnene-11β,17α-diol-3,20-dione.
10. 6α-methyl-19-nor-9β,10α-Δ⁴-pregnen-17α-ol-3, 11,20-trione.

References Cited

UNITED STATES PATENTS 3,198,792   8/1965   Reerink et al. \_\_\_\_ 260—239.55

ELBERT L. ROBERTS, *Primary Examiner*.